(12) United States Patent
Back

(10) Patent No.: US 6,610,970 B1
(45) Date of Patent: Aug. 26, 2003

(54) TRAY ASSEMBLY FOR MICROWAVE OVEN INCORPORATING TOASTER

(75) Inventor: Yoon Gun Back, Kyongsangnam-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/290,523

(22) Filed: Nov. 8, 2002

(30) Foreign Application Priority Data

Feb. 20, 2002 (KR) ............................. 2002-9093

(51) Int. Cl.[7] .................... H05B 6/80; A47J 37/00
(52) U.S. Cl. .................. 219/685; 219/680; 219/756; 219/762; 219/521; 99/392; 99/DIG. 14
(58) Field of Search ............................. 219/685, 680, 219/725, 739, 756, 762, 763, 386, 521; 99/385, 391, 392, 393, 399, 400, 402, DIG. 14, 451

(56) References Cited

U.S. PATENT DOCUMENTS 4,346,651 A * 8/1982 Schickedanz ............... 99/392
6,104,001 A * 8/2000 Huggler ...................... 219/386
6,539,840 B2 * 4/2003 Choi et al. ................... 99/331

FOREIGN PATENT DOCUMENTS

JP 4-39524 * 2/1992 ................ 219/685

* cited by examiner

*Primary Examiner*—Philip H. Leung
(74) *Attorney, Agent, or Firm*—McKenna Long & Aldridge LLP

(57) ABSTRACT

A microwave oven incorporating a toaster includes a toaster door provided on a toaster panel for opening and closing at least one toaster entrance and a tray assembly. The tray assembly includes a tray support inside the toaster and at least one tray on the tray support for holding food items while they are heated. The tray includes at least one elevating bracket for maintaining a predetermined distance between the tray and the tray support. The microwave oven incorporating a toaster further includes a heater generating heat for toasting the food item and at least one connecting link between the toaster door and tray assembly for exerting a force on the tray assembly to move when the toaster door is opened and closed. In the microwave oven incorporating a toaster, each food item is positioned against a heater included therein so as to maximize the toasting performance of the toaster.

25 Claims, 5 Drawing Sheets

TRAY ASSEMBLY FOR MICROWAVE OVEN INCORPORATING TOASTER

This claims the benefit of Korean Patent Application No. 2002-9093, filed on Feb. 20, 2002, which is hereby incorporated by reference for all purposes as if fully set forth herein.

BACKGROUND OF THE INVENTION

1 Field of the Invention

The present invention relates to a microwave oven, and more particularly, to a microwave oven incorporating a toaster.

2 Discussion of the Related Art

Generally, microwave ovens such as those illustrated in FIG. 1, heat objects (e.g., food) by applying microwaves to them. Referring to FIG. 1, microwave ovens include a cavity 2, in which an object may be heated by microwaves. The cavity 2 is formed in an interior of a cavity assembly 1 and may be opened and closed via a cavity door 4. Microwaves may be generated by various electrical devices accommodated with an electrical device chamber 10 provided near the cavity 2. The electrical device chamber may be covered with an outer case 6. The various electrical devices may include, for example, a magnetron 12 for generating microwaves, a high-voltage transformer 14 for supplying high voltage to the magnetron 12, and a fan 16 for generating an air flow inside of the cavity 2 thereby cooling the various electrical devices as they may become heated.

While conventional microwave ovens heat objects using microwaves, microwaves cannot be used to toast food (e.g., bread products). Therefore, microwave ovens capable of toasting food as well as heating an object using microwaves have become desirable. In such microwave ovens including a toaster, each food item (e.g., slice of bread, bagel, etc.) must be positioned proximate a heater within the toaster such that the toasting performance is maximized.

SUMMARY OF THE INVENTION

Accordingly, the present invention is directed to a microwave oven with a toaster that substantially obviates one or more problems due to limitations and disadvantages of the related art.

An advantage of the present invention provides a microwave oven incorporating a toaster, wherein food items may be positioned proximate a heater included within the toaster such that the toasting performance may be maximized.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a microwave oven incorporating a toaster includes, for example, a toaster door and a tray assembly. The toaster door may be arranged on a toaster panel for opening and closing at least one toaster entrance. The toaster panel may, for example, be provided on a front side of the toaster.

The toaster assembly may, for example, include a tray support arranged inside the toaster. At least one tray, for holding a food item while it is being heated, may be fastened to the top of the tray support. For example, the tray support may include a plurality of fastening slits while the tray may include at least one elevating bracket for maintaining the tray at a predetermined distance from the tray support. The elevating bracket may include at least one fastening hook extending downward and also along a first direction, parallel to the tray. Accordingly, the tray may be fastened to the tray support by inserting a fastening hook into one of the fastening slits and moving the tray in the first direction.

Additionally, the tray may include a rear flange provided at a rear end of the tray for supporting a back side of the food item on the tray. The tray support may further include a groove formed along a pivot line, about which at least one upwardly bent fixture, for supporting a rear end of the bracket, may be formed.

According to the principles of the present invention, the microwave oven incorporating a toaster further includes a heater for generating heat necessary to toast food items (e.g., slices of bread, bagels, etc.) and at least one connecting link arranged between the toaster door and the tray assembly for moving the tray assembly when the toaster is opened or closed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
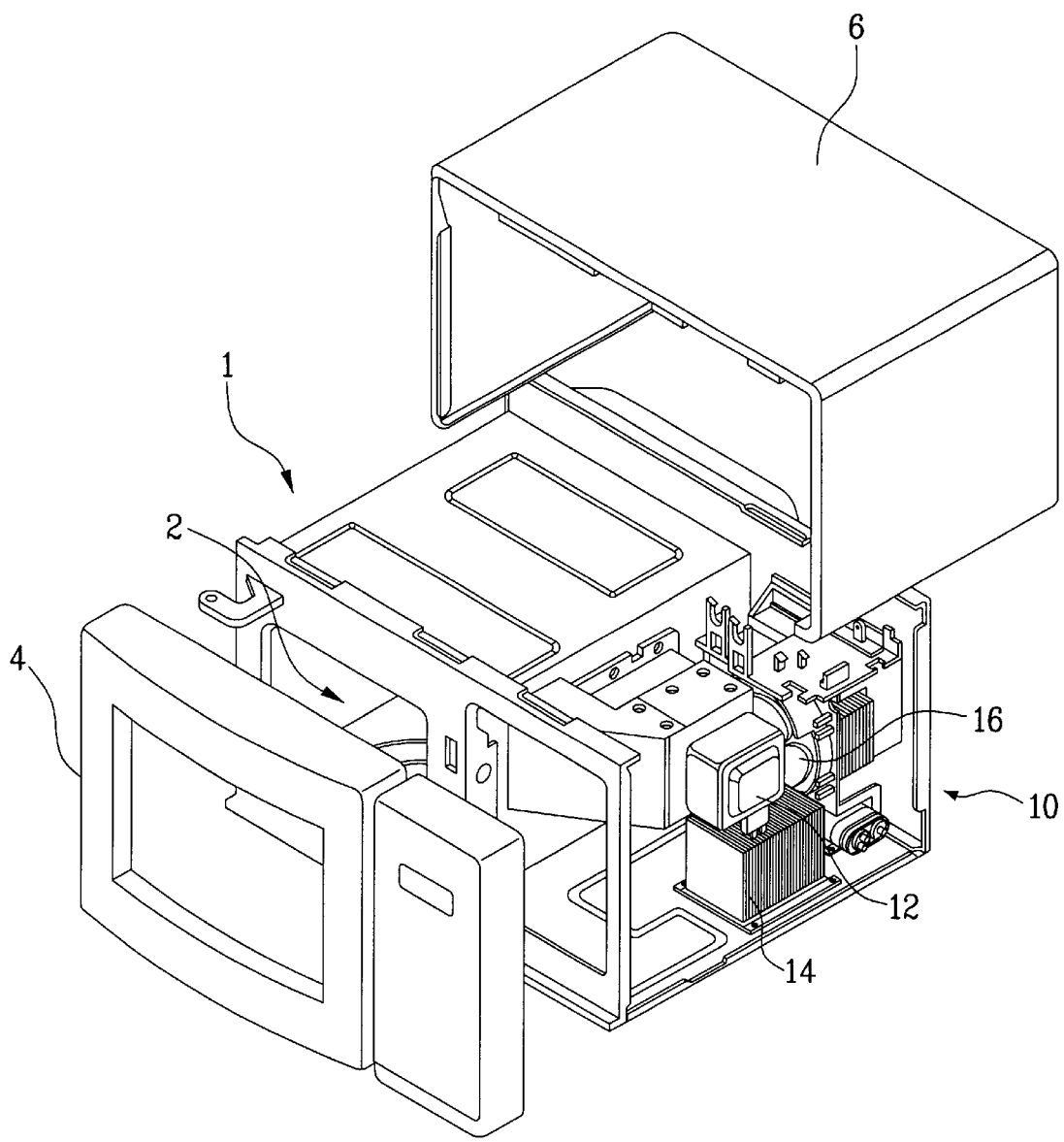
FIG. 1 illustrates an exploded perspective view of a related art microwave oven.
Figure 2:
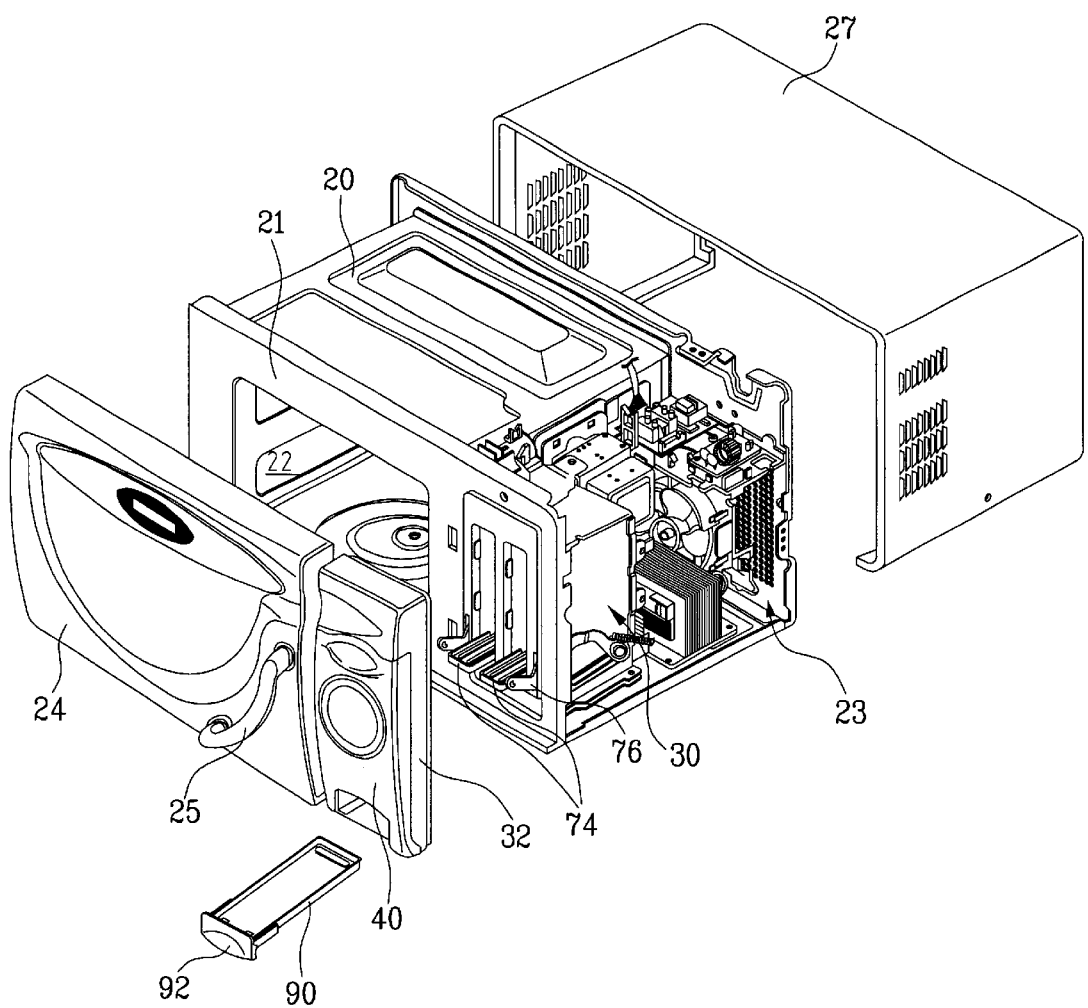
FIG. 2 illustrates an exploded perspective view of a microwave oven incorporating a toaster in accordance with the principles of the present invention.

FIG. 2 illustrates an exploded perspective view of a microwave oven incorporating a toaster in accordance with the principles of the present invention.

Referring to FIG. 2, a cavity 22 is arranged within cavity assembly 20 and an electrical device chamber 23 is arranged adjacent the cavity 22. An object (e.g., food) arranged within the cavity 22 may be heated by microwaves generated by various electrical devices arranged within the electrical device chamber 23.

The cavity 22 may be opened and closed via a cavity door 24. The cavity 22 may be closed when the cavity door 24 contacts a front plate 21. A user may open and close the cavity door 24 using a door handle 25 included within the cavity door 24.

An outer case 27 may cover the cavity assembly 20 and the electrical device chamber 23, thereby forming top and side exterior surfaces of the microwave oven. A toaster 30 may be arranged in front of the electrical devices within the electrical device chamber 23. The toaster 30 may be installed in such a way that it penetrates the front plate 21. A toaster panel 32 comprising an exterior surface material may be provided in front of the toaster 30. In one aspect of the present invention, the exterior surface material of the toaster panel 32 may be the same as that of the cavity door 24, such that a smooth surface may be formed on the front surface of the microwave oven between the toaster panel 32 and the cavity door 24.

Figure 3:
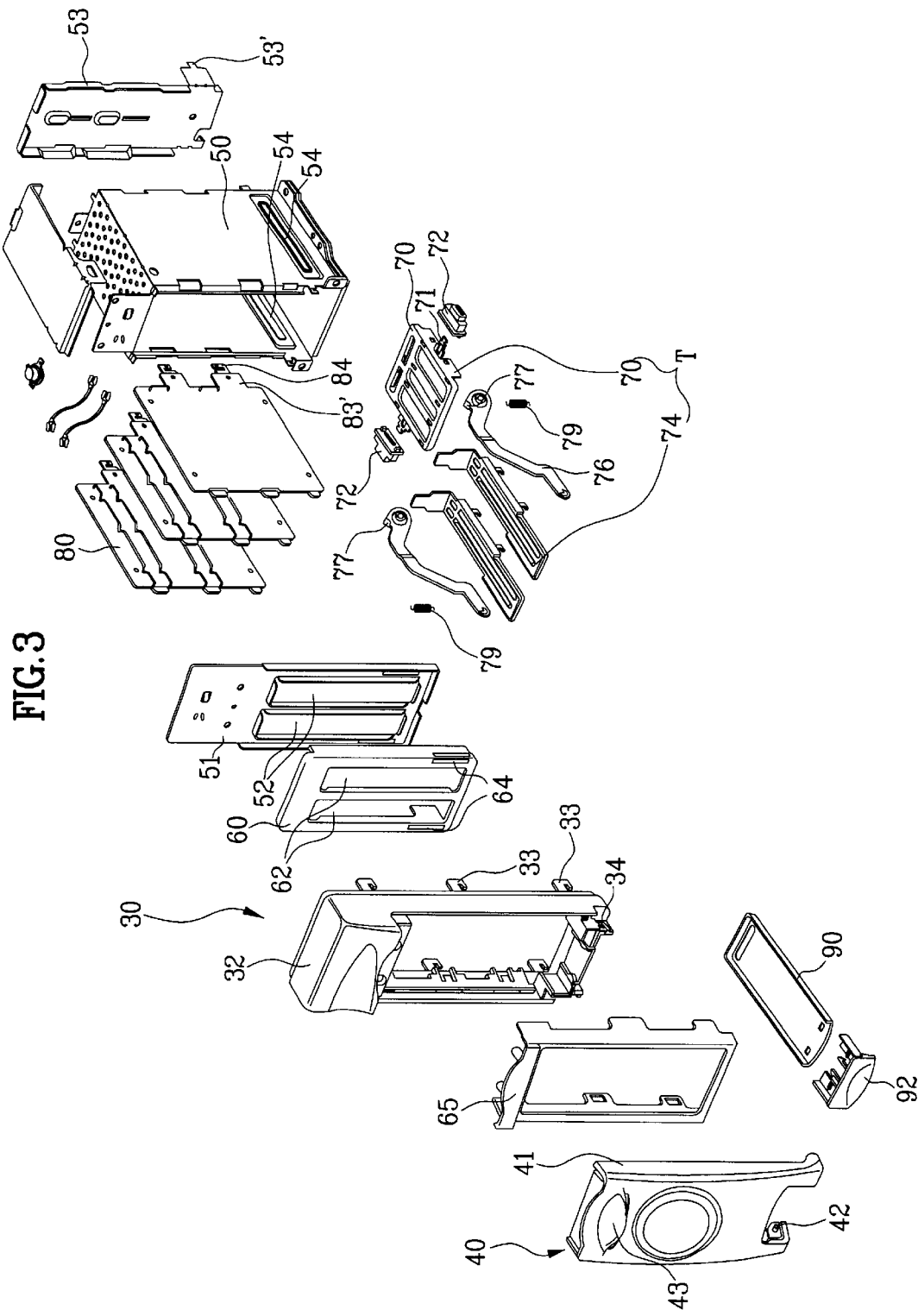
FIG. 3 illustrates an exploded perspective view of the microwave oven incorporating a toaster shown in FIG. 2.

FIG. 3 illustrates an exploded perspective view of the toaster 30 shown in FIG. 2.

Referring to FIG. 3, the rear of the toaster panel 32 may be provided with a plurality of fixing means 33 (e.g., hooks, screws, adhesive, and the like) such that the toaster panel 32 may be fixed to the front plate 21 (shown in FIG. 2) by the fixing means 33.

The toaster 30 further includes a toaster door 40 attached to the toaster panel 32 by a hinge assembly. To this end, the hinge assembly includes hinge holes 34, included within the toaster panel 32, and hinge pins 42, included within a bottom portion of the toaster door 40. Accordingly, the toaster door 40 may be opened or closed by rotating about an axis formed by the hinge pins 42 and hinge holes 34. In one aspect of the present invention, the exterior surface material of the door panel 41 may be the same as that of the toaster panel 32, such that a smooth surface may be formed on the front surface of the microwave oven between the door panel 41, the cavity door 24 and the toaster panel 32. The hinge pins 42 may be provided at the bottom of the door panel 41 in such a way that the toaster door 40 may rotated into an opened and closed position. The door panel 41 further includes a toaster door handle 43 allowing a user to open and close the toaster door 40.

Referring to still to FIG. 3, the toaster 30 further includes a toaster case 50 arranged at the back portion of the toaster panel 32. The toaster case 50 may be coupled to the toaster panel 32 through a portion of the front plate 21 corresponding to the front side of the electrical device chamber 23. In one aspect of the present invention, the toaster case 50 may be made of a metal material, provide a space for toasting each food item, and include a case front plate 51.

The case front plate 51 provided at the front of the toaster case 50 includes two case entrances 52 through which food items may pass upon their insertion into and removal from the interior of the toaster case 50. Two spring hooks 53' may be provided at the bottom of a rear case plate 53 provided at the back of the toaster case 50. Each of the spring hooks 53' may be connected to one end of a spring 79 for purposes that will be discussed in greater detail below.

A pair of moving slots 54 may be arranged within the sidewalls of the toaster case 50 and oriented along a direction parallel to the bottom edge of the toaster case sidewalls. Further, each moving slot 74 may guide a bushing 72 provided therein, as will be discussed in greater detail below.

A toaster front 60 made of metal material may be arranged at the front of the case front plate 51 and within the toaster panel 32. The toaster front 60 includes two rectangular toaster entrances 62 that may be selectively exposed or concealed when the toaster door 40 or closed, respectively. Each of the toaster entrances 62 may be coupled to respective ones of the case entrances 52. Two lever slots 64 may be provided at a bottom portion of the toaster front 60, such that a connecting lever 76 may move through a corresponding one of a lever slot 64.

The toaster 30 further includes a plurality of heaters 80 formed within the toaster case 50. The heaters 80 are capable of generating heat sufficient to toast a food item (e.g., slice of bread, etc.). Each of the heaters comprise a plurality of heating elements (e.g., heat-generating wires wound about a support plate, not shown). The heaters may be positioned at portions corresponding to sides of food items and provide heat to the both sides food items arranged within the toaster 30.

An insulation plate 65 may be arranged between the toaster front 60 and the toaster panel 32. Accordingly, the insulation plate 65 may be made of an insulating material suitable for blocking heat generated within the toaster from flowing from the toaster front 60 to the toaster panel 32.

A crumb holder 90 may be arranged at the bottom of the toaster case 50 through the lower part of the toaster panel 32. The front of the crumb holder 90 comprises a holder handle 92 provided between the hinge pins 42. In practice, a user may pull the holder handle 92 to draw out the crumb holder 90, empty the crumb holder 90, and push the holder handle 92 back thereby placing the crumb holder 90 at the bottom of the toaster case 50. In one aspect of the present invention, holder handle 92 may include a surface material that is the same as that of the door panel 41.

A tray assembly, T, arranged within the interior of the toaster case 50 will now be described in detail.

The tray assembly, T, supports at least one food item. As shown in FIG. 3, the tray assembly T includes a tray support 70 and two trays 74 arranged on the tray support 70. In one aspect of the present invention, the tray 74 may support a food item arranged vertically thereon (i.e., an orientation wherein a major surface of the food item is arranged vertically over the tray 74). Upon opening or closing the toaster door 40, the tray assembly T enables food items to be inserted into or removed from the interior of the toaster case 50.

Figure 4:
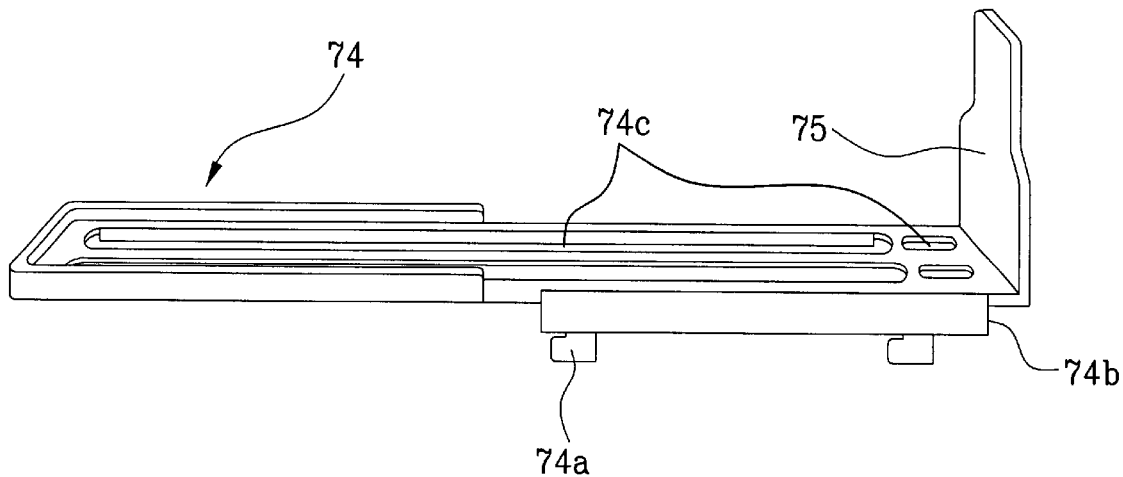
FIG. 4 illustrates a perspective view of a tray included within the toaster shown in FIG. 3.
Figure 5:
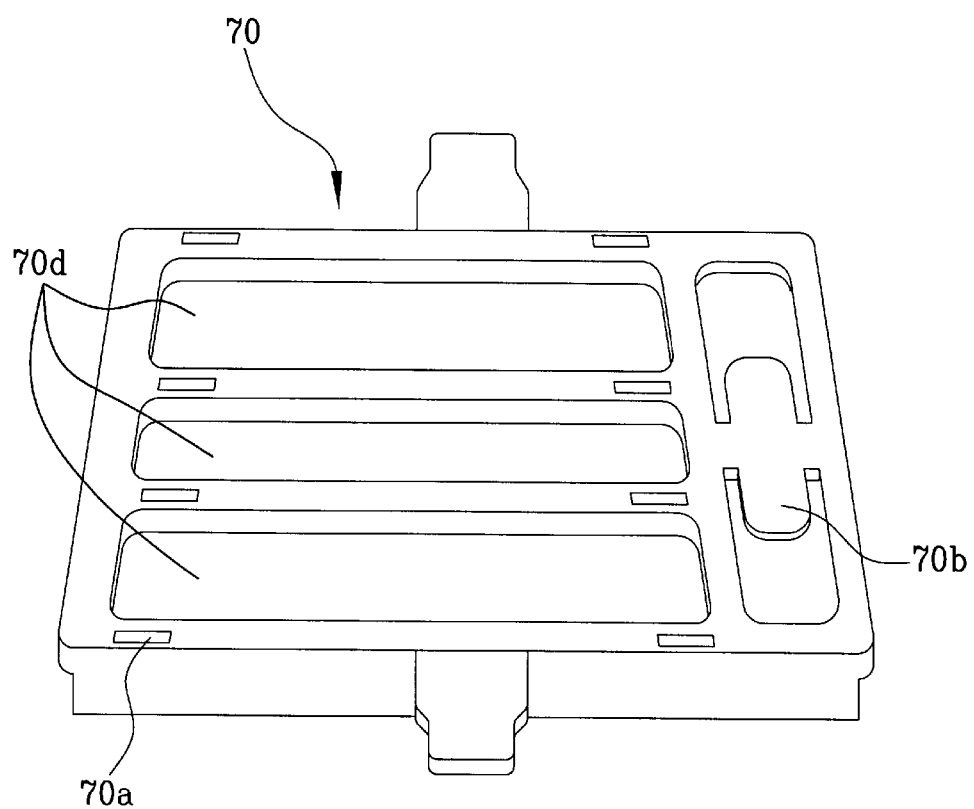
FIG. 5 illustrates a perspective view of a tray support included within the toaster shown in FIG. 3.

FIGS. 4 and 5 illustrate perspective views of the tray 74 and the tray support 70 according to principles of the present invention.

Referring to FIG. 4, the tray 74 comprises a plurality of fastening hooks 74a coupled to an elevating bracket 74b and a plurality of ventilation slits 74c for heat circulation. The elevating bracket 74b may be arranged on a lower rear portion of the tray 74 between the tray 74 and the tray support 70, such the elevating bracket 74b maintains a predetermined distance between the tray 74 and the tray support 70. The plurality of fastening hooks 74a may be formed so as to extend both downward from the elevating bracket 74b and along a first direction, toward a front end of the tray 74. Alternatively, the fastening hooks 74a may be formed so as to extend downward as described above and along a second direction toward a rear end of the tray 74.

Additionally, a rear flange 75 may be provided at the rear end of the tray 74 for supporting a food item. Accordingly, the food item may be stably positioned on the tray 74 by the rear flange 75 when the toaster door 40 is opened or closed.

Referring to FIG. 5, a plurality of fastening slits 70a may be arranged within a flat area of the tray support 70 and a plurality of air-openings 70d may be provided between the fastening slits 70a for allowing heat and air circulation. Generally, each of the fastening slits 70a accommodate respective ones of fastening hooks 74a such that the tray 74 may be securely arranged on the tray support 70. For example, the tray 74 may be securely arranged on the tray support 70 upon inserting each of the fastening hooks 74a into respective ones of the slits 70a and moving the tray 74 in the direction the ends of the fastening hooks 74a are extended toward.

Referring still to FIG. 5, two fixtures 70b may be provided at the rear of the tray support 70. After the tray 74 is securely arranged on the tray support 70, the fixtures 70b may be bent upward to support the rear ends of the elevating brackets 74b, thereby ensuring that the tray 74 is completely secured to the tray support 70.

Figure 6:
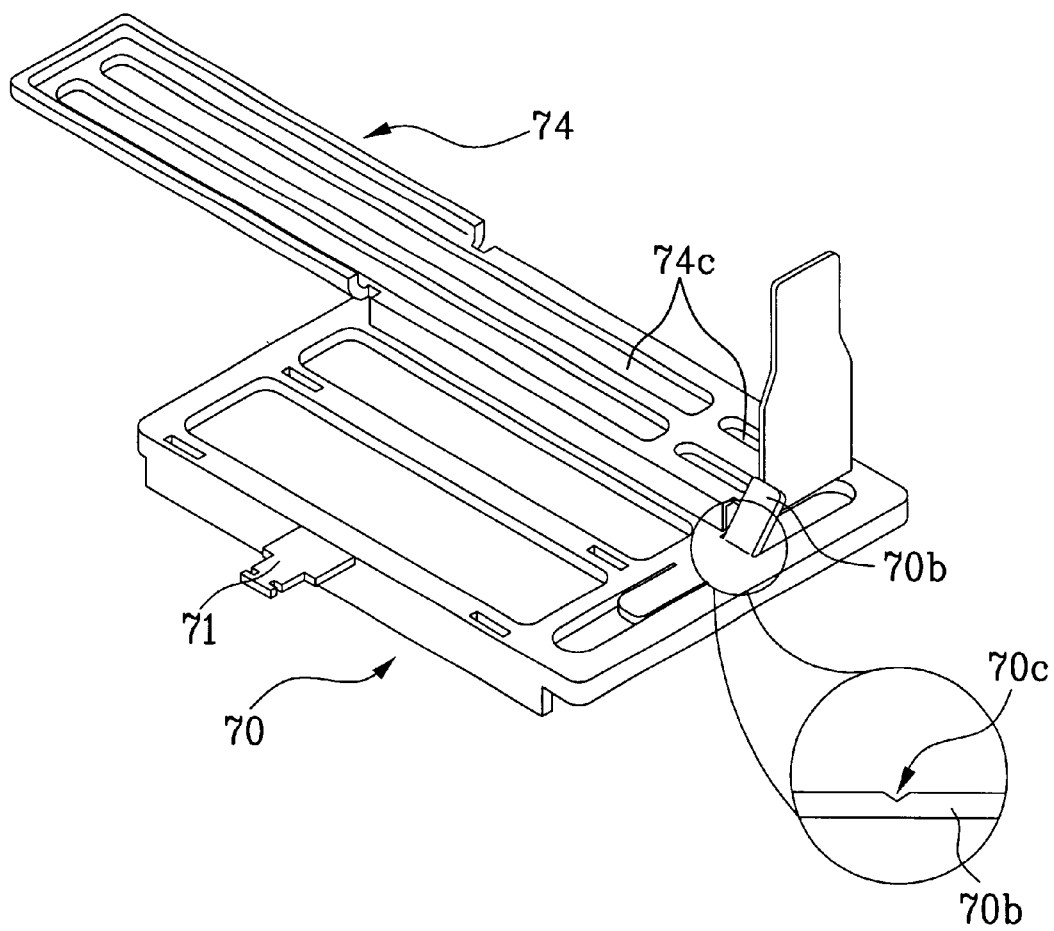
FIG. 6 illustrates a perspective view of a tray assembly included within the toaster shown in FIG. 3.

FIG. 6 illustrates a perspective view of the tray assembly, T, included within the toaster shown in FIG. 3.

Referring to FIG. 6, after the tray 74 has been moved in the direction towards which the ends of the fastening hooks 74a are extended, fixture 70b may be bent upward to an angle of about 45° such that the bent fixture 70b supports the rear end of the elevating bracket 74b. As shown in the magnified portion of FIG. 6, fixture 70b has a cross section including a groove 70c formed along a pivot line of fixture 70b allowing the fixture 70b to be easily bent.

Due to design constraints induced by the configuration of the heating plate 80 (shown in FIG. 3), it is difficult to arrange heating elements (e.g., heat-generating wires) at lower portions of each heating plate 80. By securely arranging the tray 74 on the tray support 70, however, a bottom portion on both sides of each food item may be vertically aligned proximate respective heating elements arranged on each heating plate 80 to allow an entirety of each side of each food item to be uniformly heated.

Referring back to FIG. 3, the tray support 70 includes two connecting parts 71 provided on left and right sides of the tray support 70. Bushing 72 may be provided at ends of each connecting parts 71 and inserted into a respective one of a moving slot 54. Each bushing 72 supports the tray support 70 and has a shape allowing it to move within the moving slot 54 while preventing the tray support 70 from rotating while the bushing 72 is moving. By preventing the tray support 70 from rotating, the trays 74 may always be kept parallel to the orientation of the moving slots 54. The width of the tray support 70 and the frontal width of the toaster case 50 are such that the case front plate 51 does not fall apart.

The tray support 70 may be secured to one or more trays 74, on which each food item may be placed. In one aspect of the present invention, the number of the trays 74 is equal to the number of toaster entrances 62. In another aspect of the present invention, a predetermined portion of each tray 74 may project from a corresponding toaster entrance 62 when the toaster door 40 is completely opened.

A first end of the connecting lever 76 may be rotatably coupled to the bushing 72 may be connected to a first end of a spring 79. A second end of the connecting lever 76 may be rotatably coupled to a bottom portion of the toaster door 40. A second end of the spring 79 may be connected to spring hook 53' provided at the rear case plate 53. In use, the spring 79 may exert a force on the first end of the connecting lever 76 toward the spring hook 53', thereby biasing the toaster door 40 towards a closed position.

The operation of the microwave oven incorporating a toaster according to the present invention will now be described in detail.

Referring to FIG. 2, for the sake of explanation only, it will be assumed that the toaster door 40 is closed and is thus arranged at the front of the toaster panel 32 and the surfaces of the toaster panel 32 and the toaster door 40 are flush.

If a user pulls down the toaster door handle 43 so as to open the toaster door 40, the toaster door rotates about an axis formed by the hinge pins 42 and hinge holes 34. At the same time, the connecting lever 76 moves the bushing 72 along and within the moving slot 54 such that the bushing 72 moves the tray support 70 in a direction toward the front end of the tray 74. Due to the movement of the tray support 70 and the fact that the tray 74 is securely arranged to the tray support 70, a predetermined portion of the tray 74 projects from the toaster entrance 62. In one aspect of the present invention, the predetermined portion of the tray 74 projects from the toaster entrance 62 when the toaster door is completely opened. Next, a food item may be arranged on the tray 74.

If the toaster door 40 is closed (e.g., after a food item is arranged on the tray 74), the tray support 70 is returned to its original position by a restoring force provided by the spring 79. Next, if power is supplied, the toaster 30 starts to toast the food item by generating heat from the heating element wires of the heating plate 80. Since each food item is placed on the tray 74 securely arranged on the tray support 70, the entire food item may be heated uniformly.

The rear flange 75 provided at the rear of the tray 74 supports the back of the food item such that it is stably positioned on the tray 74 when the toaster door 40 is opened after the toaster stops heating. In one aspect of the present invention, the rear flange 75 may be pulled to push a food item out from inside the toaster case if the food item were to get stuck at the case entrance 52 of the case front plate 51. For example, food item B may get stuck at the case entrance 52 if, for example, it were to lean slightly on the tray 74.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. For example, a bagel may or any other food product that may be suitably toasted within a toaster may be used in conjunction with microwave oven incorporating a toaster of the present invention.

What is claimed is:

1. A tray assembly for a microwave oven with a toaster, comprising:
    a microwave cavity;
    a toaster arranged adjacent said microwave cavity, the toaster having at least one toaster entrance;
    a tray support provided inside said toaster; and
    at least one tray provided on top of said tray support for holding a food item, said tray having at least one elevating bracket for maintaining a predetermined distance between said tray and said tray support.

2. The tray assembly of claim 1, wherein said elevating bracket comprises at least one fastening hook, said at least one fastening hook extending downward and along a first direction parallel to said tray.

3. The tray assembly of claim 2, wherein said tray support further comprises a plurality of fastening slits for accommodating said at least one fastening hook.

4. The tray assembly of claim 1, wherein said tray includes a rear flange provided at a rear end of said tray for supporting a backside of said food item.

5. The tray assembly of claim 1, wherein said tray support includes at least one fixture bent upwardly at a rear end of said tray support for supporting a rear end of said elevating bracket.

6. The tray assembly of claim 5, wherein said fixture comprises a groove formed along a pivot line about which said fixture is bent.

7. The tray assembly of claim 1, wherein said tray comprises one or more slits for heat circulation.

8. The tray assembly of claim 1, further comprising a case for supporting said tray support inside said toaster.

9. The tray assembly of claim 8, further comprising:
   a bushing; and
   a moving slot arranged within said case, wherein said moving slot is oriented parallel to said tray, wherein said bushing moves within the moving slot, and wherein said tray support is supported by said bushing.

10. The tray assembly of claim 9, further comprising:
    a connecting link having a first end and a second end, wherein said bushing is rotatably coupled to said first end;
    a toaster panel provided on a front side of said toaster;
    at least one toaster entrance;
    a toaster door, wherein said toaster door is rotatably coupled to said second end and said door being provided on the toaster panel for opening and closing said at least one toaster entrance.

11. The tray assembly of claim 10, further comprising a spring, wherein said first end is connected to said spring.

12. The tray assembly of claim 11, wherein said spring exerts a force on said first end away from said toaster door.

13. The tray assembly of claim 12, wherein said tray support further comprises one or more air-openings.

14. A microwave oven with a toaster, comprising:
    a microwave cavity;
    a toaster arranged adjacent said microwave cavity, the toaster having at least one toaster entrance;
    a toaster panel provided on a front side of said toaster;
    a toaster door provided on said toaster panel for opening and closing the at least one toaster entrance;
    a tray support provided inside said toaster;
    at least one tray provided on top of said tray support, for holding a food item while it is being heated;
    at least one elevating bracket for maintaining a predetermined distance between said tray support and said at least one tray;
    a heater for generating heat to toast said food item; and
    at least one connecting link arranged between said toaster door and said tray assembly for exerting a force on said tray assembly to move when said toaster door is opened or closed.

15. The microwave oven according to claim 14, further comprising a case for supporting said tray support inside said toaster.

16. The microwave oven of claim 15, further comprising:
    a bushing; and
    a moving slot arranged within the case, wherein said moving slot is oriented parallel to said tray, wherein said bushing moves within the moving slot, and wherein said tray support is supported by said bushing.

17. The microwave oven of claim 16, wherein said at least one connecting link further comprises:
    a first end, wherein said first end is rotatably connected to said bushing; and
    a second end, wherein said second end is rotatably connected to said toaster door.

18. The microwave oven of claim 17, further comprising a spring, wherein said first end is connected to said spring.

19. The microwave oven of claim 18, wherein said spring exerts a force on said first end away from said toaster door.

20. The microwave oven of claim 14, wherein said elevating bracket comprises at least one fastening hook, said at least one fastening hook extending downward and along a first direction parallel to said tray.

21. The microwave oven of claim 20, wherein said tray support further comprises a plurality of fastening slits for accommodating said at least one fastening hook.

22. The microwave oven of claim 14, wherein said tray includes a rear flange provided at a rear end of said tray for supporting a back side of said food item.

23. The microwave oven of claim 14, wherein said tray support includes at least one fixture bent upwardly at a rear end of said tray support for supporting a rear end of said bracket.

24. The microwave oven of claim 23, wherein said fixture comprises a groove formed along a pivot line about which said fixture is bent.

25. The microwave oven of claim 14, wherein said tray comprises one or more slits for heat circulation.

* * * * *